United States Patent
Pouchoulin (10) Patent No.: US 12,491,296 B2
(45) Date of Patent: Dec. 9, 2025

(54) APPARATUS FOR EXTRACORPOREAL TREATMENT OF BLOOD AND METHOD FOR DETERMINING WATER LOSSES IN A MEMBRANE GAS EXCHANGER OF AN APPARATUS FOR EXTRACORPOREAL TREATMENT OF BLOOD

(71) Applicant: GAMBRO LUNDIA AB, Lund (SE)

(72) Inventor: Dominique Pouchoulin, Tramoyes (FR)

(73) Assignee: GAMBRO LUNDIA AB, Lund (SE)

( * ) Notice: Subject to any disclaimer, the term of this patent is extended or adjusted under 35 U.S.C. 154(b) by 1006 days.

(21) Appl. No.: 17/624,880

(22) PCT Filed: Jul. 1, 2020

(86) PCT No.: PCT/EP2020/068514
§ 371 (c)(1),
(2) Date: Jan. 5, 2022

(87) PCT Pub. No.: WO2021/004855
PCT Pub. Date: Jan. 14, 2021

(65) Prior Publication Data
US 2022/0280704 A1 Sep. 8, 2022

(30) Foreign Application Priority Data
Jul. 9, 2019 (EP) .................... 19185220

(51) Int. Cl.
*A61M 1/16* (2006.01)
*A61M 1/14* (2006.01)
*A61M 1/36* (2006.01)

(52) U.S. Cl.
CPC .......... *A61M 1/1609* (2014.02); *A61M 1/154* (2022.05); *A61M 1/155* (2022.05);
(Continued)

(58) Field of Classification Search
CPC ........ A61M 1/16; A61M 1/154; A61M 1/155; A61M 1/3621; A61M 1/3623;
(Continued)

(56) References Cited

U.S. PATENT DOCUMENTS

| | | | |
|---|---|---|---|
| 2010/0101657 A1 | 4/2010 | Morley | |
| 2014/0227134 A1* | 8/2014 | Joost | ........... A61M 1/16 210/85 |
| 2020/0069859 A1 | 3/2020 | Klewinghaus | |

FOREIGN PATENT DOCUMENTS

| | | |
|---|---|---|
| EP | 2 238 995 | 10/2010 |
| JP | S61-162952 A | 7/1986 |

(Continued)

OTHER PUBLICATIONS

Japanese Patent Application No. 2022-500918, filed Jul. 1, 2020; Office Action issued Mar. 21, 2024, English language translation.
(Continued)

*Primary Examiner* — Jessica Arble
(74) *Attorney, Agent, or Firm* — Mueting Raasch Group (57) ABSTRACT

A method for determining water losses in a membrane gas exchanger of an apparatus for extracorporeal treatment of blood, comprises: obtaining a sweep gas flow rate ($Q_{gas}$) in a gas side of a membrane gas exchanger (19); obtaining a water saturation content ($C_{saturation\_out}$) at a gas outlet (19*d*) of the membrane gas exchanger (19); calculating the water losses ($Q_{eccor}$) as a function at least of the sweep gas flow rate ($Q_{gas}$) and the water saturation content ($C_{saturation\_out}$).

29 Claims, 3 Drawing Sheets

(52) U.S. Cl.
CPC ......... *A61M 1/3621* (2013.01); *A61M 1/3623* (2022.05); *A61M 2205/3327* (2013.01); *A61M 2205/3334* (2013.01); *A61M 2205/3368* (2013.01); *A61M 2205/3379* (2013.01)

(58) Field of Classification Search
CPC .. A61M 2205/3327; A61M 2205/3334; A61M 2205/3368; A61M 2205/3379; A61M 1/3666; A61M 1/3627; A61M 1/3609; A61M 60/113
See application file for complete search history.

(56) References Cited

FOREIGN PATENT DOCUMENTS

| WO | WO 2016/103789 | 6/2016 |
| WO | WO 2018/109071 | 6/2018 |

OTHER PUBLICATIONS

PCT Search Report and Written Opinion for PCT/EP2020/068514 dated Aug. 20, 2020 (14 pages).
Extended European Search Report for Application No. 19185220.1 dated Jan. 15, 2020 (8 pages).

* cited by examiner

APPARATUS FOR EXTRACORPOREAL TREATMENT OF BLOOD AND METHOD FOR DETERMINING WATER LOSSES IN A MEMBRANE GAS EXCHANGER OF AN APPARATUS FOR EXTRACORPOREAL TREATMENT OF BLOOD

This application is a U.S. National Stage Application of International Application No. PCT/EP2020/068514 filed Jul. 1, 2020, which was published in English on Jan. 14, 2021 as International Publication No. WO 2021/004855 A1. International Application No. PCT/EP2020/068514 claims priority to European Application No. 19185220.1 filed Jul. 9, 2019.

The invention relates to an apparatus for extracorporeal treatment of blood, in particular an apparatus provided with a membrane gas exchanger, e.g. for the purpose of $CO_2$ removal, and to a method for detecting water losses in a membrane gas exchanger of an apparatus for extracorporeal treatment of blood.

In the field of extracorporeal treatment of blood, in an haemodialysis treatment a patient's blood and a treatment liquid approximately isotonic with blood flow are circulated in a respective compartment of haemodialyser, so that, impurities and undesired substances present in the blood (urea, creatinine, etc.) may migrate by diffusive transfer from the blood into the treatment liquid. The ion concentration of the treatment liquid is chosen so as to correct the ion concentration of the patient's blood. In a treatment by haemodiafiltration, a convective transfer by ultrafiltration, resulting from a positive pressure difference created between the blood side and the treatment-liquid side of the membrane of a haemodiafilter, is added to the diffusive transfer obtained by dialysis.

In the field of blood extracorporeal blood treatments and therapies, membrane gas exchangers are used for the purpose of Extra-Corporeal Membrane Oxygenation (ECMO) and/or Extra-Corporeal $CO_2$ Removal ($ECCO_2R$). While originally used in dedicated systems, development of Extra-Corporeal $CO_2$ Removal has recently led to the introduction of membrane gas exchangers in dialysis systems for Continuous Renal Replacement Therapy (CRRT). Carbon dioxide $CO_2$ is removed by diffusion through the gas exchange membrane from blood to gas flowing on the other membrane side (sweep gas flow). The CRRT systems can deliver $ECCO_2R$ therapy (stand-alone $ECCO_2R$), as well as CRRT and $ECCO_2R$ combined in the same blood circuit.

During $CO_2$ removal, at the same time $CO_2$ is extracted, part of water is transferred and evaporated into the sweep gas flow, leading to both heat and water losses from the blood compartment.

The water losses are ignored in prior art apparatuses and introduce systematic bias in the patient fluid balance which is of the same order of magnitude as the system fluid balance accuracy.

Indeed, water evaporation to the sweep gas flow has two main consequences:
  it adds to the patient fluid removal in an uncontrolled amount;
  it cools down blood (significant latent heat associated to water evaporation).

The fluid balance aspect may have clinical consequences, as water losses through the gas exchanger may be in the range of a few 100 ml per day and thus it's comparable to the claimed accuracy of fluid balancing system of the apparatus.

It is therefore an object of the present invention to provide an apparatus for extracorporeal treatment of blood configured to provide a correct fluid balance to the patient during extracorporeal blood treatment, in order to avoid or to reduce the risk of clinical consequences for the patient.

In particular, it is an object of the present invention to improve the accuracy of existing fluid balancing systems of apparatuses for extracorporeal treatment of blood provided with gas exchangers for the purpose of $CO_2$ removal.

Additionally, it is an object providing an apparatus able to assure a correct fluid balance which do not require any additional and peculiar component/device.

SUMMARY

At least one of the above objects is substantially reached by an apparatus for extracorporeal treatment of blood and by a method for determining water losses in a membrane gas exchanger of an apparatus for extracorporeal treatment of blood according to one or more of the appended claims.

Apparatus and methods according to aspects of the invention and capable of achieving one or more of the above objects are here below described.

A $1^{st}$ aspect concerns an apparatus for extracorporeal treatment of blood comprising: optionally a blood treatment unit;
  an extracorporeal blood circuit, optionally coupled to the blood treatment unit;
  a blood pump configured to be coupled to a pump section of the extracorporeal blood circuit; optionally, a fluid circuit coupled to the blood treatment unit;
  at least a membrane gas exchanger operatively coupled to the extracorporeal blood circuit and/or to the fluid circuit to exchange gas from blood flowing in the extracorporeal blood circuit and/or with fluid flowing in the fluid circuit, wherein the membrane gas exchanger comprises a blood or fluid side having a blood or fluid inlet and a blood or fluid outlet in fluid communication with the extracorporeal blood circuit or with the fluid circuit and a gas side crossed by a sweep gas and having a gas inlet and a gas outlet;
  a control unit configured for commanding execution of a task, said task comprising at least the following steps:
    exchanging gas between the blood or fluid flowing through the blood or fluid side of the membrane gas exchanger and the sweep gas flowing through the gas side of the membrane gas exchanger;
    determining blood or fluid water losses occurring in the membrane gas exchanger due to gas exchange;
    issuing a signal informing of the water losses and/or compensating at least in part for said water losses, optionally automatically.

A $2^{nd}$ aspect concerns a method for exchanging gas in an apparatus for extracorporeal treatment of blood, wherein the apparatus for extracorporeal treatment of blood comprises:
  optionally a blood treatment unit;
  an extracorporeal blood circuit, optionally coupled to the blood treatment unit;
  a blood pump configured to be coupled to a pump section of the extracorporeal blood circuit;
  optionally, a fluid circuit coupled to the blood treatment unit;
  at least a membrane gas exchanger operatively coupled to the extracorporeal blood circuit and/or to the fluid circuit to exchange gas with blood flowing in the extracorporeal blood circuit and/or with fluid flowing in the fluid circuit, wherein the membrane gas exchanger comprises a blood or fluid side in fluid communication with the extracorporeal blood circuit or with the fluid circuit and a gas side crossed by a sweep gas;

wherein the method comprises:

exchanging gas between the blood or fluid and the sweep gas in the membrane gas exchanger;

determining blood or fluid water losses occurring in the membrane gas exchanger due to gas exchange;

issuing a signal informing of the water losses and/or compensating at least in part for said water losses, optionally automatically.

A $3^{rd}$ aspect concerns a method for determining water losses in a membrane gas exchanger of an apparatus for extracorporeal treatment of blood, wherein the apparatus for extracorporeal treatment of blood comprises:

optionally a blood treatment unit;

an extracorporeal blood circuit, optionally coupled to the blood treatment unit;

a blood pump configured to be coupled to a pump section of the extracorporeal blood circuit;

optionally, a fluid circuit coupled to the blood treatment unit;

at least a membrane gas exchanger operatively coupled to the extracorporeal blood circuit to exchange gas with blood flowing in the extracorporeal blood circuit and/or with fluid flowing in the fluid circuit, wherein the membrane gas exchanger comprises a blood or fluid side in fluid communication with the blood circuit or with the fluid circuit and a gas side crossed by a sweep gas;

wherein the method comprises:

obtaining a sweep gas flow rate in the gas side of the membrane gas exchanger;

calculating the blood or fluid water losses as a function at least of the sweep gas flow rate.

In a $4^{th}$ aspect according to any one of the preceding aspects, the membrane gas exchanger is a carbon dioxide $CO_2$ remover and/or the exchanged gas is carbon dioxide ($CO_2$) and is removed from blood or fluid; optionally wherein the membrane gas exchanger is an oxygenator and/or the exchanged gas is oxygen and is added to blood or fluid; optionally wherein the membrane gas exchanger is a carbon dioxide $CO_2$ remover and an oxygenator and/or carbon dioxide (CO2) is removed from blood or fluid while oxygen is added to blood or fluid.

In a $5^{th}$ aspect according to any one of the preceding aspects, the membrane gas exchanger comprises a gas permeable membrane separating the blood or fluid side and gas side, wherein optionally the gas permeable membrane comprises a plurality of hollow fibers.

In a $6^{th}$ aspect according to the preceding aspects, a sweep gas source is connected to the gas inlet to feed sweep gas through the gas side of the membrane gas exchanger, wherein optionally the sweep gas is dried gas or humidified gas, wherein optionally the sweep gas is air, optionally dried air or humidified air, dioxygen or a mixture of air and dioxygen; wherein optionally a device for humidifying the sweep gas is placed between the sweep gas source and the gas inlet.

In a $7^{th}$ aspect according to any one of the preceding aspects, the extracorporeal blood circuit comprises a blood withdrawal line and a blood return line connectable to a patient, wherein the blood withdrawal line is connected to the blood inlet of the membrane gas exchanger and the blood return line is connected to the blood outlet of the membrane gas exchanger.

In a $8^{th}$ aspect according to any one of the preceding aspects 1 to 6, the apparatus comprises the blood treatment unit, wherein the extracorporeal blood circuit is coupled to the blood treatment unit.

In a $9^{th}$ aspect according to the preceding aspect 8, the blood treatment unit comprises a primary chamber and a secondary chamber separated by a semi-permeable membrane, wherein the extracorporeal blood circuit comprises a blood withdrawal line connected to an inlet of the primary chamber and a blood return line connected to an outlet of the primary chamber; optionally wherein the fluid circuit is connected to the secondary chamber; optionally wherein the fluid circuit comprises an effluent fluid line connected to an outlet of the secondary chamber and a dialysis fluid line connected to an inlet of the secondary chamber; optionally wherein, in at least one configuration, the fluid circuit presents a closed loop connected to the secondary chamber.

In a $10^{th}$ aspect according to any of the preceding aspects 8 or 9, the membrane gas exchanger is placed on the blood return line or on the blood withdrawal line and/or the membrane gas exchanger is placed on the fluid circuit, optionally on the closed loop.

In a $11^{th}$ aspect according to any one of the preceding aspects, determining the blood water losses comprises:

obtaining a sweep gas flow rate in the gas side of the membrane gas exchanger;

optionally obtaining a water saturation content at the gas outlet of the membrane gas exchanger;

optionally obtaining a water saturation content at the gas inlet of the membrane gas exchanger;

calculating the blood or fluid water losses as a function at least of the sweep gas flow rate and optionally of the water saturation content at the gas outlet and optionally of the water saturation content at the gas inlet.

In a $12^{th}$ aspect according to the preceding aspect 11, determining the blood water losses further comprises:

obtaining a relative humidity at the gas outlet of the membrane gas exchanger;

optionally obtaining a relative humidity at the gas inlet of the membrane gas exchanger;

calculating the blood water losses also as a function of the relative humidity at the gas outlet and optionally of the relative humidity at the gas inlet.

In a $13^{th}$ aspect according to any one of the preceding aspects 11 or 12, obtaining the sweep gas flow rate comprises:

measuring directly or indirectly the sweep gas flow rate; or collecting a sweep gas flow rate prescribed value.

In a $14^{th}$ aspect according to any one of the preceding aspects 11 to 13, obtaining the water saturation content at the gas outlet comprises:

obtaining a blood or fluid inlet temperature at the blood or fluid inlet of the membrane gas exchanger;

calculating the water saturation content as a function of the blood or fluid inlet temperature;

optionally if the sweep gas is humidified, wherein obtaining the water saturation content at the gas inlet comprises:

obtaining a humidification temperature, wherein optionally the humidification temperature is measured or calculated or is a constant default value, optionally a room temperature;

calculating the water saturation content at the gas inlet as a function of the humidification temperature.

In a $15^{th}$ aspect according the preceding aspect, the blood or fluid inlet temperature is measured or calculated or is a constant default value.

In a 16th aspect according to any one of the preceding aspects 12 or 13 to 15 when according to aspect 12, obtaining the relative humidity at the gas outlet comprises:
deriving the relative humidity at the gas outlet from the type of the membrane gas exchanger and optionally of the sweep gas flow rate; or
assuming the relative humidity at the gas outlet equal to 100%, e.g. if type of the membrane gas exchanger is unknown;

wherein, optionally, obtaining the relative humidity at the gas inlet comprises:
if the sweep gas is humidified, assuming the relative humidity at the gas inlet equal to 100%;
if the sweep gas is not humidified, assuming the relative humidity at the gas inlet equal to 0%.

In a 17th aspect according to any one of the preceding aspects, compensating at least in part for the blood or fluid water losses comprises: adding water into the extracorporeal blood circuit or into the fluid circuit, optionally via a solution, optionally via a glucose or an electrolytes/infusion solution.

In a 18th aspect according to any one of the preceding aspects, compensating at least in part for the blood or fluid water losses comprises: reducing net fluid removal from the extracorporeal blood circuit.

In a 19th aspect according to any one of the preceding aspects when according to aspect 9, the fluid circuit comprises an effluent fluid line connected to an outlet of the secondary chamber and an effluent pump operating on the effluent fluid line, wherein compensating at least in part for the blood or fluid water losses comprises: adjusting the effluent pump.

In a 20th aspect according to the preceding aspect, the control unit is configured for adjusting the effluent pump by adjusting, optionally reducing, a pump speed of the effluent pump as a function of the calculated blood or fluid water losses.

In a 21st aspect according to any one of the preceding aspects, a source of water, optionally of a solution, optionally a glucose solution or an electrolytes/infusion solution, is connected, directly or indirectly (e.g. through the fluid circuit or an infusion line), to the extracorporeal blood circuit through a water line, wherein a water pump operates on the water line, wherein compensating at least in part for said blood or fluid water losses comprises: infusing water, optionally via the solution, optionally the glucose solution or the electrolytes/infusion solution into the extracorporeal blood circuit; optionally wherein said water or solution infusion is not to be balanced by the effluent pump.

In a 22nd aspect according to the preceding aspect, the control unit is configured for adjusting a flow rate of the water or of the solution infused in the in the extracorporeal blood circuit as a function of the calculated blood water losses.

In a 23rd aspect according to the preceding aspects 21 or 22, wherein compensating at least in part for the water losses comprises: adjusting the water pump.

In a 24th aspect according to aspects 21 or 22 or 23, the water line ends into the extracorporeal blood circuit, optionally at a mixing site to minimize hemolysis.

In a 25th aspect according to the preceding aspect 24, the water line is connected to the blood circuit between the blood pump and the membrane gas exchanger, optionally between the blood pump and the blood treatment unit, and/or downstream of the membrane gas exchanger.

In a 26th aspect according to any of aspects 21 to 23 when according to aspect 9, the fluid circuit comprises the dialysis fluid line connected to the inlet of the secondary chamber and to a dialysis liquid source and, optionally, at least one dialysis pump coupled or configured to be coupled to a pump section of the dialysis fluid line; wherein the water line ends into the dialysis fluid line.

In a 27th aspect according to the preceding aspect 26, the water line is connected to the dialysis fluid line at a connection point located between the dialysis pump and the blood treatment unit.

In a 28th aspect according to any one of the preceding aspects 21 to 23, an infusion circuit comprising one or more infusion lines of a replacement fluid is connected to the extracorporeal blood circuit and, optionally, at least one infusion pump coupled or configured to be coupled to a pump section of the infusion line; wherein the water line ends into at least one of the infusion lines.

In a 29th aspect according to the preceding aspect, the water line is connected to the infusion line at a connection point located between the infusion pump and the extracorporeal blood circuit.

In a 30th aspect according the preceding aspect 28 or 29, the infusion line is connected to the extracorporeal blood circuit between the blood pump and the membrane gas exchanger, optionally between the blood pump and the blood treatment unit; optionally wherein an infusion line is connected upstream of the blood pump.

In a 31st aspect according the preceding aspect 28 or 29, the infusion line is connected to the blood circuit downstream of the membrane gas exchanger.

In a 32nd aspect, the signal or signals informing of the water losses is/are a visual signal/s indicating a value/s of said water losses; wherein, optionally, said signal/s is/are shown on a display, optionally of a control panel connected to the control unit or of a remote device.

In a 33rd aspect, determining the blood water losses comprises:
obtaining a sweep gas flow rate in the gas side of the membrane gas exchanger;
obtaining a blood or fluid inlet temperature at the blood or fluid inlet of the membrane gas exchanger;
obtaining a room temperature;
calculating the blood or fluid water losses as a function at least of the sweep gas flow rate and of the blood or fluid inlet temperature and, optionally, of the room temperature.

In a 34th aspect according to the previous aspect, determining the blood water losses comprises:
calculating a water rate at the gas outlet as a function of the blood or fluid inlet temperature;
calculating a water rate at the gas inlet as a function of the room temperature;
calculating the blood or fluid water losses as difference between the water rate at the gas outlet and the water rate at the gas inlet.

In a 35th aspect according to the previous aspect, parameters correlating the water rate at the gas outlet and the blood or fluid inlet temperature are derived through calculation and parameters correlating the water rate at the gas inlet and the room temperature are derived through experimental tests.

DESCRIPTION OF THE DRAWINGS

Aspects of the invention are shown in the attached drawings, which are provided by way of non-limiting example, wherein.

DETAILED DESCRIPTION

Figure 1:
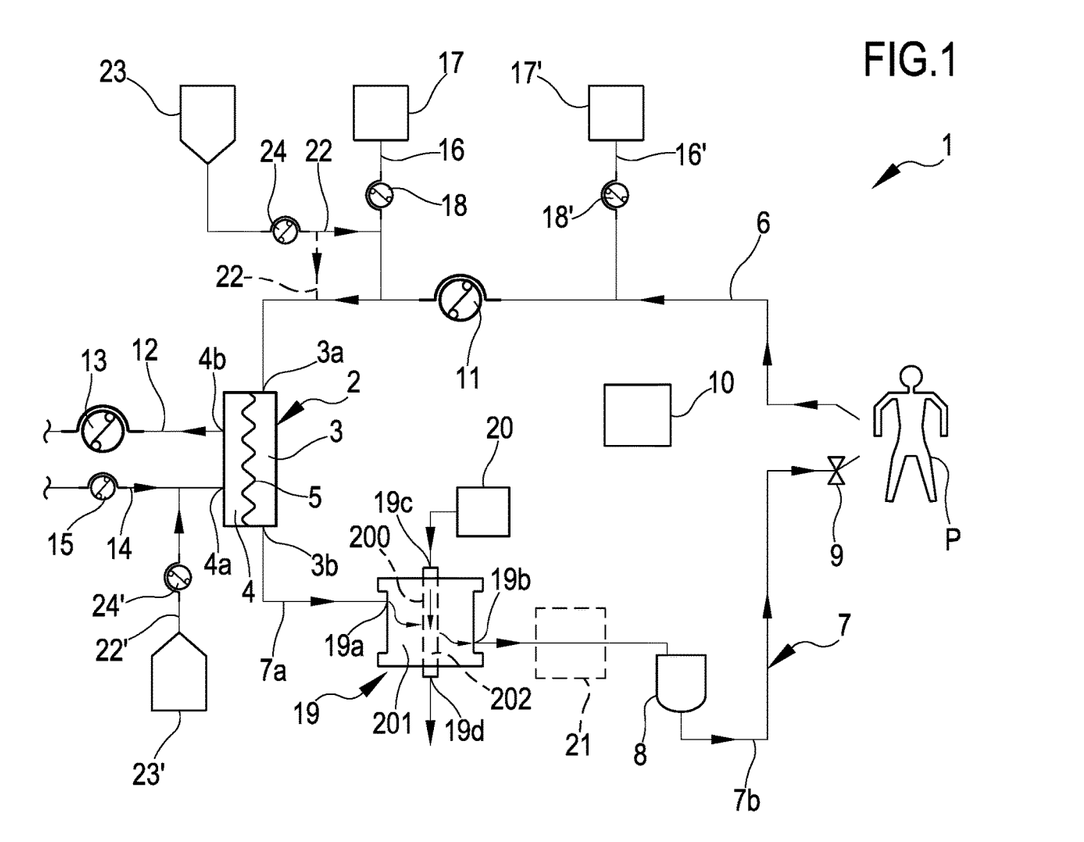
FIG. 1 shows a schematic diagram of an apparatus for extracorporeal treatment of blood.
Figure 2:
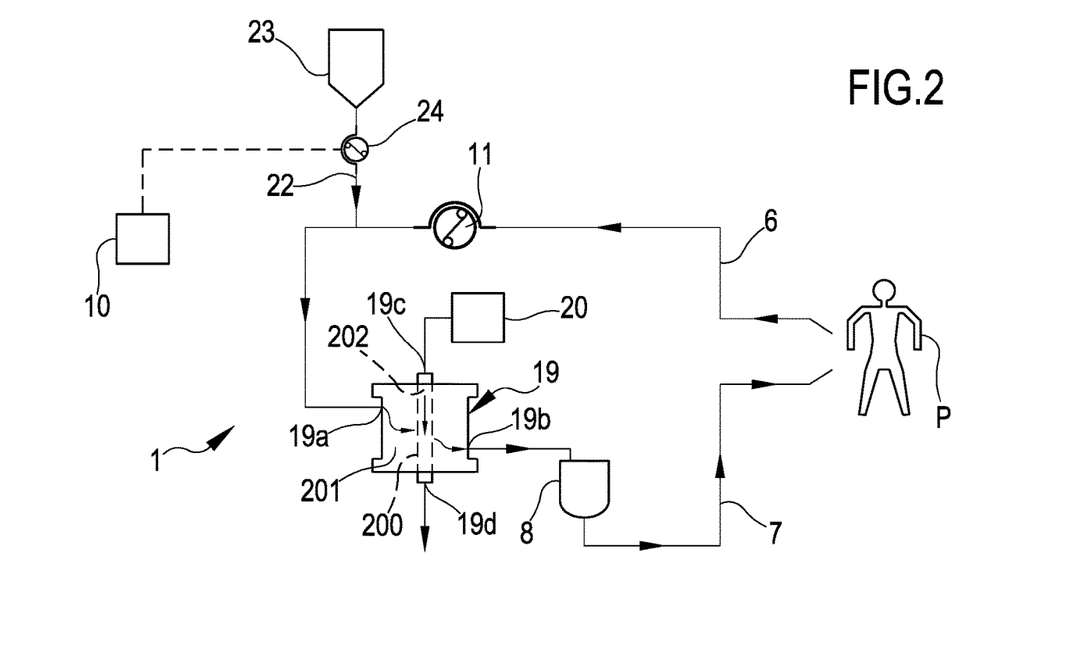
FIG. 2 shows a schematic diagram of an alternative embodiment of an apparatus for extracorporeal treatment of blood.
Figure 3:
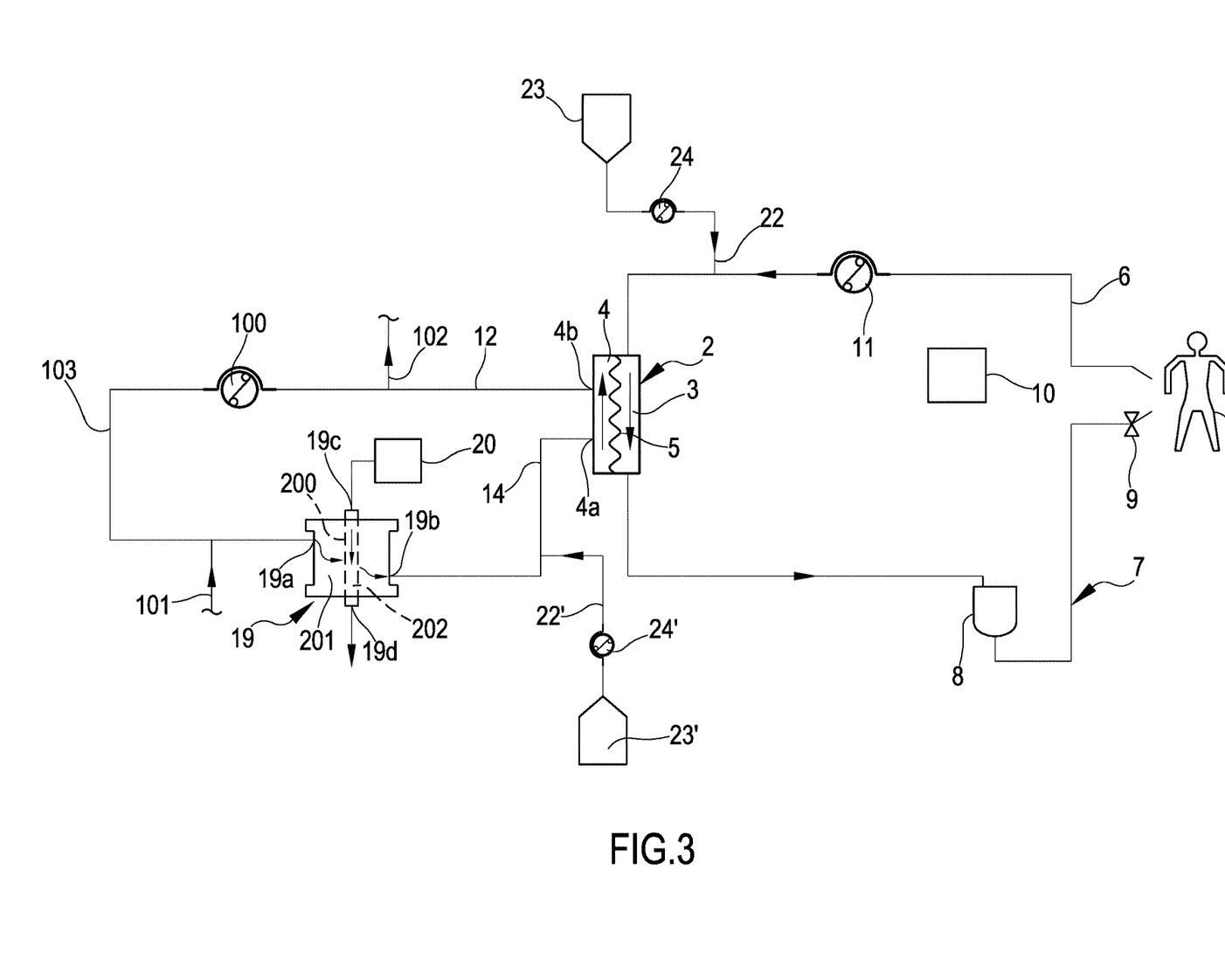
FIG. 3 shows a schematic diagram of a further embodiment of an apparatus for extracorporeal treatment of blood.

Non-limiting embodiments of an apparatus 1 for extracorporeal treatment of blood—which may implement innovative aspects of the invention—are shown in FIGS. 1, 2 and 3. In below description and in FIGS. 1, 2 and 3 same components are identified by same reference numerals.

In FIG. 1 it is represented an apparatus for the extracorporeal treatment of blood 1 comprising a blood treatment unit 2 (such as an hemofilter, an ultrafilter, an hemodiafilter, a dialyzer, a plasmafilter and the like) having a primary chamber 3 and a secondary chamber 4 separated by a semi-permeable membrane 5; depending upon the treatment, the semi-permeable membrane 5 of the blood treatment unit 2 may be selected to have different properties and performances. A blood withdrawal line 6 is connected to an inlet 3a of the primary chamber 3, and a blood return line 7 is connected to an outlet 3b of the primary chamber 3. In use, the blood withdrawal line 6 and the blood return line 7 are connected to a needle or to a catheter or other access device (not shown) which is then placed in fluid communication with the patient "P" vascular system, such that blood may be withdrawn through the blood withdrawal line 6, flown through the primary chamber 3 and then returned to the patient's vascular system through the blood return line 7. An air separator, such as a deaeration chamber 8, may be present on the blood return line 7. Moreover, a safety return clamp 9 controlled by a control unit 10 may be present on the blood return line 7, downstream the deaeration chamber 8. A bubble sensor, for instance associated to the deaeration chamber 8 or coupled to a portion of the line 7 between the deaeration chamber 8 and the return clamp 9 may be present: if present, the bubble sensor is connected to the control unit 10 and sends to the control unit 10 signals for the control unit 10 to cause closure of the return clamp 9 in case one or more bubbles above safety thresholds are detected. The blood flow through the blood lines is controlled by a blood pump 11, for instance a peristaltic blood pump, acting either on the blood withdrawal line 6 or on the blood return line 7. The embodiment of FIGS. 1, 2 and 3 shows the blood pump 11 coupled to a pump section of the withdrawal line 6.

An operator may enter a set value for the blood flow rate $Q_B$ through a user interface and the control unit 10, during treatment, is configured to control the blood pump 11 based on the set blood flow rate $Q_B$.

The control unit 10 may comprise a digital processor (CPU) with memory (or memories), an analogical type circuit, or a combination of one or more digital processing units with one or more analogical processing circuits. In the present description and in the claims it is indicated that the control unit 10 is "configured" or "programmed" to execute steps: this may be achieved in practice by any means which allow configuring or programming the control unit 10. For instance, in case of a control unit 10 comprising one or more CPUs, one or more programs are stored in an appropriate memory: the program or programs containing instructions which, when executed by the control unit 10, cause the control unit 10 to execute the steps described and/or claimed in connection with the control unit 10. Alternatively, if the control unit 10 is of an analogical type, then the circuitry of the control unit 10 is designed to include circuitry configured, in use, to process electric signals such as to execute the control unit 10 steps herein disclosed.

An effluent fluid line 12 or spent dialysate line is connected, at one end, to a fluid outlet 4b of the secondary chamber 4 and, at its other end, to a waste which may be a discharge conduit or an effluent fluid container collecting the fluid extracted from the secondary chamber. An effluent pump 13 that operates on the effluent fluid line 12 under the control of the control unit 10 to regulate the flow rate $Q_{eff}$ across the effluent fluid line.

The apparatus of FIG. 1 includes a dialysis fluid line 14 connected at one end with a fresh dialysis liquid source and at its other end with a fluid inlet 4a of the secondary chamber 4 of the treatment unit 2 for supplying fresh dialysis liquid to the secondary chamber 4. A dialysis fluid pump 15 is operative on the dialysis fluid line 14 under the control of the control unit 10, to supply fluid from a dialysis liquid container, not shown, to the secondary chamber 4 at a flow rate $Q_{dial}$.

The effluent fluid line 12, the dialysis fluid line 14 and the secondary chamber 4 of the blood treatment unit 2 are part of a fluid circuit of the apparatus 1.

The embodiment of FIG. 1 presents an infusion line 16 connected to the blood withdrawal line 6 between the blood pump 11 and the treatment unit 2. This infusion line 16 supplies replacement fluid from an infusion fluid container 17 connected at one end of the infusion line 16. Note that, alternatively or in addition to the infusion line 16, the apparatus of FIG. 1 may include a post-dilution fluid line (not shown) connecting an infusion fluid container to the blood return line 7 and/or a pre-blood pump infusion line 16' with its own infusion fluid container 17'. Furthermore, an infusion pump 18 operates on the infusion line 16 and an infusion pump 18' operates on the pre-blood pump infusion line 16' to regulate respective flow rates $Q_{rep}$ through the infusion lines 16, 16'. Note that in case of two or more infusion lines (pre-dilution and post-dilution and pre-blood pump infusion line 16') each infusion line may be provided with a respective infusion pump.

The apparatus for the extracorporeal treatment of blood 1 further comprises a membrane gas exchanger 19 placed on the blood return line 7, i.e. downstream of the blood treatment unit 2 with respect to a flow direction of blood during treatment. The membrane gas exchanger 19 comprises a gas permeable membrane 200 separating a blood side 201 and a gas side 202. A first section 7a of the blood return line 7 coming from the blood treatment unit 2 is connected to a blood inlet 19a of the blood side 201 of the membrane gas exchanger 19 and a second section 7b of the blood return line 7, connected to the needle or to the catheter, is connected to a blood outlet 19b of the blood side 201 of the membrane gas exchanger 19. The gas side 202 of the membrane gas exchanger 19 is provided with a respective gas inlet 19c and gas outlet 19d for sweep gas (e.g. air or dioxygen or a mixture of air and dioxygen).

The internal structure of the membrane gas exchanger 19 may be per se known. The gas permeable membrane 200 separates the blood side 201 and gas side 202. The gas permeable membrane 200 may comprise a plurality of hollow fibers defining said membrane. The sweep or ventilating gas (e.g. dioxygen, air, dried air, humidified air) is passed through the inside (gas side) of the hollow fibers, while the blood is passed around (blood side) the hollow fibers to accomplish gas exchange by diffusion. The membrane gas exchanger 19 is operatively coupled to the extracorporeal blood circuit to exchange gas with blood flowing in the extracorporeal blood circuit. The membrane gas exchanger 19 of the disclosed embodiments of FIGS. 1, 2 and 3 is a $CO_2$ remover. Carbon dioxide $CO_2$ diffuses from the blood side 201 into the gas for disposal. The apparatus 1 of FIG. 1 can deliver stand-alone $CO_2$ removal as well as dialysis and $CO_2$ removal combined in the same blood circuit.

In other embodiments, the membrane gas exchanger 19 may be an oxygenator configured to add oxygen to blood or may be configured to add oxygen to blood simultaneously to the removal of carbon dioxide $CO_2$.

A sweep gas source 20, like a gas bottle, is connected to the gas inlet 19c to feed sweep gas through the gas side of the membrane gas exchanger 19.

In a variant embodiment, the membrane gas exchanger 19 may be placed on the blood withdrawal line 6.

A blood warmer 21 may optionally be placed on the blood return line 7 between the membrane gas exchanger 19 and the bubble trap 8.

The blood withdrawal line 6, the blood return line 7, the primary chamber 3 of the treatment unit 2 and the blood side 201 of the membrane gas exchanger 19 form part of an extracorporeal blood circuit of the apparatus 1. The infusion lines 16, 16' form part of a infusion circuit of the apparatus 1.

The blood pump 11, the effluent pump 13, the dialysis fluid pump 15, the infusion pumps 18, 18' and possible other pumps are operatively connected to the control unit 10 which controls said pumps. The control unit 10 is also operatively connected to sensors (like flow sensors and/or pressure sensors) on the blood circuit and/or fluid circuit and/or infusion circuit. The control unit 10 is also operatively connected to clamps and valves, like the return clamp 9. The control unit 10 is also connected to the user interface, not shown, for instance a graphic user interface, which receives operator's inputs and displays the apparatus outputs. For instance, the graphic user interface may include a touch screen, a display screen and hard keys for entering user's inputs or a combination thereof. During extracorporeal blood treatment, the control unit 10 is configured to control at least the pumps 11, 13, 15, 18, 18' to make sure that a prefixed patient net fluid removal is achieved in the course of a treatment time, as required by a prescription provided to the control unit 10, e.g. via the user interface.

The apparatus 1 of FIG. 1 further comprises a water line 22 connected to a source 23 of water in a solution, e.g. a glucose solution in a bag, and to the infusion line 16 at a connection point located between the infusion pump 18 and the extracorporeal blood circuit. A water pump 24 operates on the water line 22 to regulate a flow rate of water $Q_{water}$ through the water line 22. According to a variant embodiment (dashed line in FIG. 1), the water line 22 is directly connected to the extracorporeal blood circuit between the blood pump 11 and the blood treatment unit 2.

A further water line 22' connected to a water source 23' and coupled to a water pump 24' is connected to the dialysis fluid line 14 at a connection point located between the dialysis pump 15 and the fluid inlet 4a of the secondary chamber 4 of the blood treatment unit 2.

The apparatus 1 of FIG. 1 is configured to deliver Continuous Renal Replacement Therapy (CRRT) in combination with $ECCO_2R$ therapy or $ECCO_2R$ therapy alone.

Figure 4:
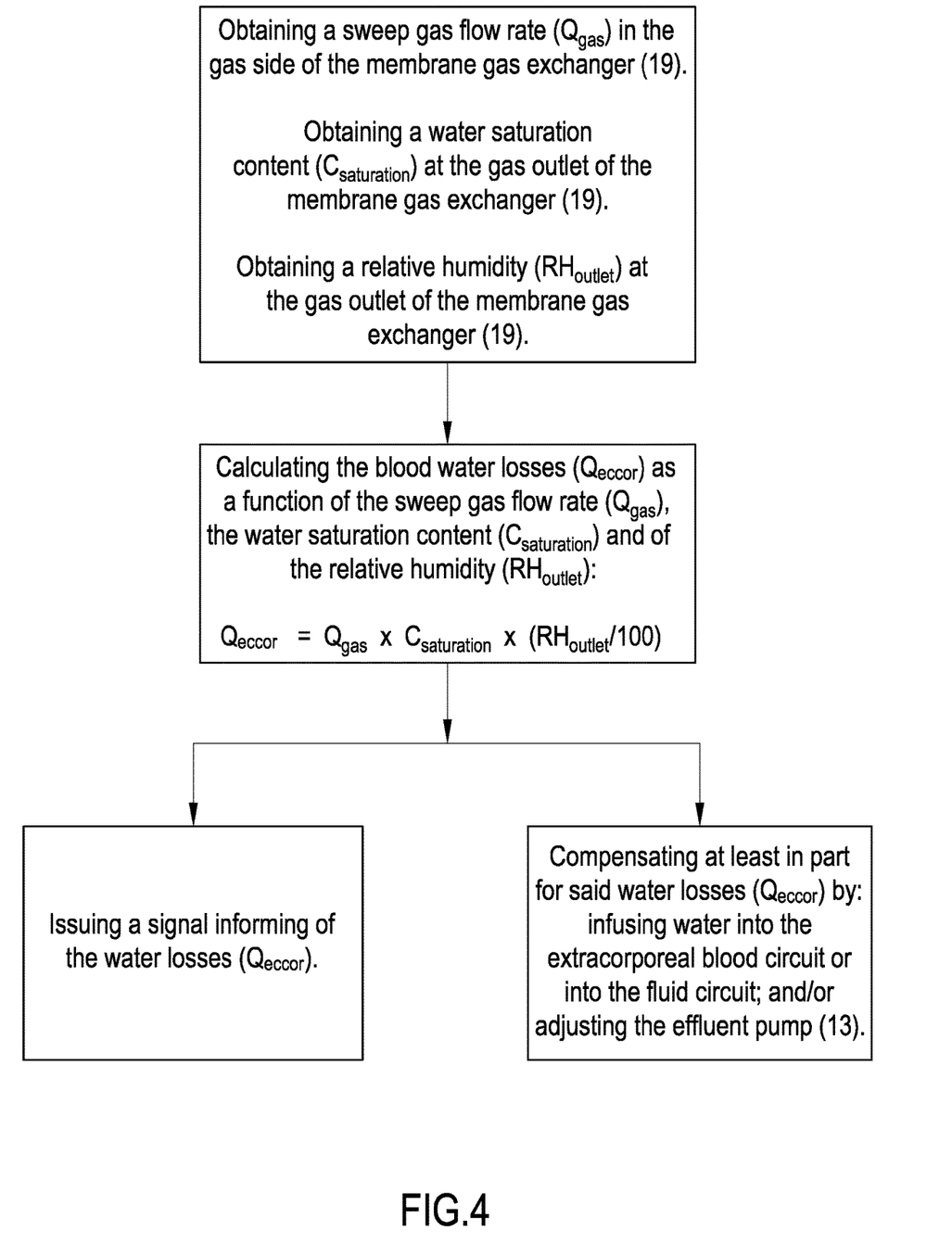
FIG. 4 is a flowchart of a method of the invention.

The control unit 10 is configured to control the apparatus to perform treatment of patient "P" through the extracorporeal blood treatment unit 2 and the membrane gas exchanger 19. The control unit 10 is also configured for commanding execution of a task, according to a method of the invention, in order to take into account blood water losses $Q_{eccor}$ occurring in the membrane gas exchanger 19 due to $CO_2$ removal (FIG. 4).

Said task comprises at least the following steps:
removing gas ($CO_2$) from blood flowing through the blood side of the membrane gas exchanger 19;
determining blood water losses $Q_{eccor}$ occurring in the membrane gas exchanger 19 due to gas exchange (i.e. water evaporation to sweep gas);
issuing a signal informing of the water losses and/or compensating at least in part for said water losses $Q_{eccor}$.

Gas is removed from blood by passing sweep or ventilating gas (e.g. dioxygen, air, dried air, humidified air) through the inside (gas side 202) of the hollow fibers of the membrane gas exchanger 19 while blood passes around (blood side 201) the hollow fibers to accomplish gas exchange by diffusion.

In order to determine water losses $Q_{eccor}$ in the membrane gas exchanger 19, the control unit is configured to perform a calculation through the following formula:

$$Q_{eccor} = Q_{gas} \times C_{saturation\_out} \times (RH_{outlet}/100) \qquad \text{i)}$$

wherein:
$Q_{eccor}$ blood water losses in the gas exchanger 19;
$Q_{gas}$ sweep gas flow rate through the gas exchanger 19;
$C_{saturation\_out}$ water saturation content at the gas outlet 19d;
$RH_{outlet}$ relative humidity at the gas outlet 19d.

In an embodiment, the gas flow rate $Q_{gas}$ (L/min) may be directly measured, e.g. through a flow sensor, not shown, operatively connected to the control unit 10. In an embodiment, the gas flow rate $Q_{gas}$ may be a prescribed value collected from a storage memory of the control unit 10 or inputted by an operator, e.g. through a keyboard or touchscreen, following a query to the operator.

In an embodiment, the water saturation content $C_{saturation\_out}$ at the gas outlet 19d is derived assuming that gas will leave the membrane gas exchanger 19 at the same temperature that blood flows in and knowing the blood temperature from the patient "P" or from the extracorporeal blood circuit at the blood inlet 19a of the membrane gas exchanger 19. In an embodiment, a temperature sensor is placed at the blood inlet 19a and the blood inlet temperature $T_{in}$ is measured. In an embodiment, the temperature sensor may be placed at the gas outlet 19d. In an embodiment, a different temperature is measured (e.g. from the patient "P" or from a different point of the extracorporeal blood circuit) and the blood inlet temperature $T_{in}$ is computed by the control unit 10 through a mathematical model integrating heat losses to atmosphere and/or fluid exchange. In an embodiment, a constant default temperature may be considered as blood inlet temperature $T_{in}$. The water saturation content $C_{saturation\_out}$ is then calculated as a function of the blood inlet temperature $T_{in}$.

In an embodiment, the relative humidity $RH_{outlet}$ (%) at the gas outlet 19d is derived from the type of the membrane gas exchanger 19 and the sweep gas flow rate $Q_{gas}$; it is a value associated to the type of membrane gas exchanger 19. It may be less than 100% for small membrane gas exchangers 19 combined with large gas flow rates $Q_{gas}$. In an embodiment, the relative humidity $RH_{outlet}$ is set equal to 100%, e.g. if type of the membrane gas exchanger 19 is unknown.

In an embodiment, the sweep gas entering the gas inlet 19c is humidified, e.g. through a device placed between the sweep gas source 20 and the gas inlet 19c. Therefore, the control unit 10 is configured to perform a calculation, taking into account also said humidification, through the following formula:

$$Q_{eccor} = Q_{gas} \times ((C_{saturation\_out} \times (RH_{outlet}/100)) - (C_{saturation\_in} \times (RH_{inlet}/100))) \quad \text{ii})$$

wherein:

$Q_{eccor}$ blood water losses in the gas exchanger 19;

$Q_{gas}$ sweep gas flow rate through the gas exchanger 19;

$C_{saturation\_out}$ water saturation content at the gas outlet 19d;

$RH_{outlet}$ relative humidity at the gas outlet 19d;

$C_{saturation\_in}$ water saturation content at the gas inlet 19c;

$RH_{inlet}$ relative humidity at the gas inlet 19c.

The water saturation content $C_{saturation\_in}$ at the gas inlet 19c is calculated as a function of the humidification temperature $T_{hum}$, typically of the room temperature $T_{room}$, which may be measured or calculated or is a constant default value. The relative humidity $RH_{inlet}$ at the gas inlet 19c is assumed equal to 100% if the sweep gas is humidified or it is assumed equal to 0% if the sweep gas is not humidified.

In another embodiment, the control unit 10 is configured to perform the calculation, taking into account also the gas humidification, through the following formula:

$$Q_{eccor} = [Q_{gas} \times (\alpha(T_{in}))] - [Q_{gas} \times (\beta(T_{room}))] \quad \text{iii})$$

wherein:

$Q_{gas} \times (\alpha(T_{in}))$ is the water rate at the gas outlet 19d;

$Q_{gas} \times (\beta(T_{room}))$ is the water rate at the gas inlet 19c;

$T_{in}$ is the blood temperature at the blood inlet 19a;

$T_{room}$ is the room temperature.

Functions $\alpha$ and $\beta$ are derived through calculation and/or experimental tests and may have the following shape:

$$\alpha(T_{in}) = (a + b \times T_{in}) \quad 1)$$

$$\beta(T_{room}) = d + e \times T_{room} \quad 2)$$

Equations 1 and 2 may be derived from air water saturation tables or from experimental measurements.

Compensation for the water losses $Q_{eccor}$ may be achieved by adding water into the extracorporeal blood circuit and/or by reducing net fluid removal from the extracorporeal blood circuit.

The control unit 10 may be configured to issue a signal to alert an operator of the calculated losses $Q_{eccor}$ and to inform the operator of the calculated value. The control unit 10 may display such value on a screen of a control panel or may send the signal to a remote device, such as a laptop. This allows for a possible medical intervention. The operator may adjust the net fluid removal prescription or provides for infusion water via a solution, e.g. glucose solution or electrolytes/infusion solution, into the extracorporeal blood circuit or directly in the patient "P".

In an embodiment, the control unit 10 is configured to automatically compensate by infusing water at the computed water losses $Q_{eccor}$ directly in the extracorporeal blood circuit or in the infusion line 16 via the source of water 23, the water line 22 and the water pump 24. In an embodiment, water is infused in the dialysis fluid line 14 via the water line 22', the water source 23' and water pump 24'. The control unit 10 is configured for adjusting a flow rate of the water or of the solution infused in the in the extracorporeal blood circuit as a function of the calculated blood water losses $Q_{eccor}$. The water flow rate is adjusted by adjusting a speed of the water pump 24, 24'. In these embodiments, the effluent pump 13 speed is unchanged with respect to standard treatment. Water may be infused as pure water or via a solution, e.g. glucose solution or electrolytes/infusion solution. Said water or solution infusion is not to be balanced by the effluent pump 13.

In an embodiment, when using glucose solution, automatic infusion may take place directly in the blood circuit of the patient "P".

If pure water is infused directly in the extracorporeal blood circuit, the water line 22 ends into the extracorporeal blood circuit at a mixing site to minimize hemolysis.

In an embodiment, compensation through reduction of net fluid removal from the extracorporeal blood circuit is achieved by adjusting the effluent pump 13. The control unit 10 is configured to automatically adjusting, e.g. reducing, a speed of the effluent pump 13 as a function of the calculated blood water losses $Q_{eccor}$.

FIG. 2 shows a different embodiment of the extracorporeal blood treatment 1. The same reference numerals for the same elements of FIG. 1 have been used. The extracorporeal blood treatment 1 of FIG. 2 does not comprise the blood treatment unit 2 but it's only equipped with the membrane gas exchanger 19. The membrane gas exchanger 19 is the only device in the circuit and the apparatus 1 is configured to deliver only $ECCO_2R$ therapy (stand-alone $ECCO_2R$).

The blood withdrawal line 6 is connected to the blood inlet 19a of the membrane gas exchanger 19 and the blood return line 7 is connected to the blood outlet 19b of the membrane gas exchanger 19.

The water line 22 is connected to the source 23 of water in a solution, e.g. a glucose solution in a bag, and to the extracorporeal blood circuit between the blood pump 11 and the membrane gas exchanger 19. The water pump 24 operates on the water line 22 to regulate a flow rate of water $Q_{water}$ through the water line 22. According to a variant embodiment (not shown), the water line 22 is connected downstream of the membrane gas exchanger 19.

In this embodiment, compensation for the water losses $Q_{eccor}$ is achieved by adding water via glucose solution directly into the extracorporeal blood circuit through the water line 22. The control unit 10 is configured for adjusting a flow rate of the water or of the glucose solution infused in the in the extracorporeal blood circuit as a function of the calculated blood water losses $Q_{eccor}$. The water flow rate is adjusted by adjusting a speed of the water pump 24.

FIG. 3 shows a further embodiment of the extracorporeal blood treatment 1. The same reference numerals for the same elements of FIG. 1 have been used.

The extracorporeal blood treatment 1 of FIG. 3 differs from the embodiment of FIG. 1 in that the fluid circuit, comprising the dialysis fluid line 14 and the effluent fluid line 12, comprises a closed loop provided with a loop pump 100 and connected to the secondary chamber 4 and in that the membrane gas exchanger 19 is placed on the fluid circuit instead of on the extracorporeal blood circuit.

The dialysis fluid line 14 comprises a first line 101 connected to the fresh dialysis liquid source, not shown. The effluent line 12 comprises a second line 102 connected to the waste, not shown. A bridging line 103 connects dialysis fluid line 14, upstream of the first line 101, to the effluent line 12, downstream of the second line 102. The dialysis fluid line 14, the effluent line 12 and the bridging line 103 form a loop line departing from the fluid outlet 4b and ending into the fluid inlet 4a. Valves and/or clamps, not shown, allow to change the configuration of the fluid circuit. In a configuration, dialysis fluid from the fresh dialysis liquid source flows in the dialysis fluid line 14 into the secondary chamber 4 and spent dialysate flows form the secondary chamber 4 into the effluent fluid line 12 and then into the waste. In a configuration, dialysate recirculates in the closed loop line.

In the embodiment of FIG. 3, the membrane gas exchanger 19 is placed on the dialysis fluid line 14 between the first line 101 and the fluid inlet 4a. The membrane gas exchanger 19 comprises a fluid side 201 having a fluid inlet 19a and a fluid outlet 19b in fluid communication with the fluid circuit and a gas side 202 crossed by a sweep gas and having a gas inlet 19c and a gas outlet 19d.

In this embodiment, carbon dioxide $CO_2$, in the form of dissolved gas and/or bicarbonate, moves from blood in the primary chamber 3 to the recirculating dialysate in the secondary chamber 4 of the blood treatment unit 2. Then, in the membrane gas exchanger 19, gas is exchanged between the fluid flowing through the fluid side 201 of the membrane gas exchanger 19 and the sweep gas flowing through the gas side 202 of the membrane gas exchanger 19. In the membrane gas exchanger 19, carbon dioxide $CO_2$ moves from the recirculating dialysate in the fluid side 201 to the sweep gas in the gas side 202.

Determination of water losses in the membrane gas exchanger 19 is substantially the same as disclosed above. The control unit 10 is configured to automatically compensate by infusing water at the computed water losses $Q_{eccor}$ directly in the extracorporeal blood circuit via the water line 22, the water source 23 and water pump 24 and/or water is infused in the dialysis fluid line 14 via the water line 22', the water source 23' and water pump 24'.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

The invention claimed is:

1. An apparatus for extracorporeal treatment of blood comprising:
   an extracorporeal blood circuit;
   a blood pump configured to be coupled to a pump section of the extracorporeal blood circuit;
   at least one membrane gas exchanger operatively coupled to the extracorporeal blood circuit to exchange gas with blood flowing in the extracorporeal blood circuit, wherein the membrane gas exchanger comprises a blood side having a blood inlet and a blood outlet in fluid communication with the extracorporeal blood circuit and a gas side crossed by a sweep gas and having a gas inlet and a gas outlet;
   a control unit configured for commanding execution of a task, said task comprising:
   exchanging gas between the blood flowing through the blood side of the membrane gas exchanger and the sweep gas flowing through the gas side of the membrane gas exchanger;
   determining blood water losses occurring in the membrane gas exchanger due to gas exchange;
   compensating at least in part for said blood water losses.

2. The apparatus according to claim 1, wherein determining the blood water losses comprises:
   obtaining a sweep gas flow rate in the gas side of the membrane gas exchanger;
   calculating the blood water losses as a function at least of the sweep gas flow rate.

3. The apparatus according to claim 2, wherein determining the blood water losses comprises:
   obtaining a water saturation content at the gas outlet of the membrane gas exchanger;
   obtaining a water saturation content at the gas inlet of the membrane gas exchanger;
   calculating the blood water losses as a function also of the water saturation content at the gas outlet and of the water saturation content at the gas inlet.

4. The apparatus according to claim 2, wherein determining the blood water losses further comprises:
   obtaining a relative humidity at the gas outlet of the membrane gas exchanger;
   obtaining a relative humidity at the gas inlet of the membrane gas exchanger;
   calculating the blood water losses also as a function of the relative humidity at the gas outlet and of the relative humidity at the gas inlet.

5. The apparatus according to claim 3, wherein obtaining the water saturation content at the gas outlet comprises:
   obtaining a blood inlet temperature at the blood inlet of the membrane gas exchanger, wherein the blood inlet temperature is measured or calculated or is a constant default value;
   calculating the water saturation content at the gas outlet as a function of the blood inlet temperature;
   wherein obtaining the water saturation content at the gas inlet comprises:
   obtaining a humidification temperature, wherein the humidification temperature is measured or calculated or is a constant default value;
   calculating the water saturation content at the gas inlet as a function of the humidification temperature.

6. The apparatus according to claim 4, wherein obtaining the relative humidity at the gas outlet comprises:
   deriving the relative humidity at the gas outlet from the type of the membrane gas exchanger and of the sweep gas flow rate; or
   assuming the relative humidity at the gas outlet equal to 100%;
   wherein obtaining the relative humidity at the gas inlet comprises:
   if the sweep gas is humidified, assuming the relative humidity at the gas inlet equal to 100%; or
   if the sweep gas is not humidified, assuming the relative humidity at the gas inlet equal to 0%.

7. The apparatus according to claim 1, wherein compensating at least in part for the blood water losses comprises: adding water into the extracorporeal blood circuit and/or reducing net fluid removal from the extracorporeal blood circuit.

8. The apparatus according to claim 7, wherein adding water into the extracorporeal blood circuit is not to be balanced by an effluent pump.

9. The apparatus according to claim 1, further comprising a blood treatment unit coupled to the extracorporeal blood circuit, wherein the blood treatment unit comprises a primary chamber and a secondary chamber separated by a semi-permeable membrane; wherein the extracorporeal blood circuit comprises a blood withdrawal line connected to an inlet of the primary chamber and a blood return line connected to an outlet of the primary chamber; wherein a fluid circuit comprises an effluent fluid line connected to an outlet of the secondary chamber and an effluent pump operating on the effluent fluid line;
   wherein compensating at least in part for said blood water losses comprises: adjusting the effluent pump.

10. The apparatus according to claim 1, comprising a source of a water solution connected to the extracorporeal blood circuit through a water line, wherein a water pump operates on the water line, wherein compensating at least in part for said water losses comprises: infusing the water solution into the extracorporeal blood circuit.

11. The apparatus according to claim 10, wherein the control unit is configured for adjusting a flow rate of the water solution infused in the extracorporeal blood circuit as a function of the blood water losses.

12. The apparatus according to claim 10, wherein the water line is directly connected to the extracorporeal blood circuit at a connection point located downstream of the blood pump.

13. The apparatus according to claims 10, further comprising a blood treatment unit comprising a primary chamber and a secondary chamber separated by a semi-permeable membrane; wherein the extracorporeal blood circuit comprises a blood withdrawal line connected to an inlet of the primary chamber and a blood return line connected to an outlet of the primary chamber; wherein a dialysis fluid line is connected to the inlet of the secondary chamber and to a dialysis liquid source and at least one dialysis pump is coupled or configured to be coupled to a pump section of the dialysis fluid line; wherein the water line ends into the dialysis fluid line.

14. The apparatus according to claim 13, wherein the water line is connected to the dialysis fluid line at a connection point located between the dialysis pump and the blood treatment unit.

15. The apparatus according to claim 12 comprising an infusion circuit comprising one or more infusion lines of a replacement fluid connected to the extracorporeal blood circuit and at least one infusion pump coupled to a pump section of the infusion line; wherein the water line ends into at least one of the infusion lines.

16. The apparatus according to claim 1, wherein the apparatus comprises a blood treatment unit that comprises a fluid circuit comprising an effluent fluid line connected to an outlet of a secondary chamber of the blood treatment unit and a dialysis fluid line connected to an inlet of the secondary chamber of the blood treatment unit such that the fluid circuit presents a closed loop connected to the secondary chamber.

17. The apparatus according to claim 1, wherein determining the blood water losses comprises:
obtaining a sweep gas flow rate in the gas side of the membrane gas exchanger;
obtaining a blood inlet temperature at the blood inlet of the membrane gas exchanger;
obtaining a room temperature;
calculating the blood water losses as a function at least of the sweep gas flow rate and of the blood inlet temperature and of the room temperature.

18. The apparatus according to claim 17, wherein determining the blood water losses comprises:
calculating a water flow rate at the gas outlet as a function of the blood inlet temperature;
calculating a water flow rate at the gas inlet as a function of the room temperature;
calculating the blood water losses as difference between the water flow rate at the gas outlet and the water flow rate at the gas inlet.

19. The apparatus according to claim 18, wherein calculating the blood water losses is according to the following formula:

$$Q_{eccor} = [Q_{gas\text{-}out} \times (\alpha(T_{in}))] - [Q_{gas\text{-}in} \times (\beta(T_{room}))]$$

wherein:
$Q_{eccor}$ is the blood water losses;
$Q_{gas\text{-}out} \times (\alpha(T_{in}))$ is the water flow rate at the gas outlet;
$Q_{gas\text{-}in} \times (\beta(T_{room}))$ is the water flow rate at the gas inlet;
$T_{in}$ is the blood inlet temperature at the blood inlet;
$T_{room}$ is the room temperature; and
wherein paraments correlating the water flow rate at the gas outlet and the blood inlet temperature are derived through calculation and parameters correlating the water flow rate at the gas inlet and the room temperature are derived through experimental tests.

20. An apparatus for extracorporeal treatment of blood comprising:
a blood treatment unit;
an extracorporeal blood circuit coupled to the blood treatment unit;
a blood pump configured to be coupled to a pump section of the extracorporeal blood circuit;
a fluid circuit coupled to the blood treatment unit;
at least one membrane gas exchanger operatively coupled to the fluid circuit to exchange gas with fluid flowing in the fluid circuit, wherein the membrane gas exchanger comprises a fluid side having a fluid inlet and a fluid outlet in fluid communication with the fluid circuit and a gas side crossed by a sweep gas and having a gas inlet and a gas outlet;
a control unit configured for executing the following steps:
exchanging gas between the fluid flowing through the fluid side of the membrane gas exchanger and the sweep gas flowing through the gas side of the membrane gas exchanger;
determining fluid water losses occurring in the membrane gas exchanger due to gas exchange;
compensating at least in part for said water losses.

21. An apparatus for extracorporeal treatment of blood comprising:
a blood treatment unit;
an extracorporeal blood circuit coupled to the blood treatment unit;
a blood pump configured to be coupled to a pump section of the extracorporeal blood circuit;
a fluid circuit coupled to the blood treatment unit;
at least one membrane gas exchanger operatively coupled to the extracorporeal blood circuit or to the fluid circuit to exchange gas with blood flowing in the extracorporeal blood circuit or with fluid flowing in the fluid circuit, wherein the at least one membrane gas exchanger comprises a blood or fluid side having a blood or fluid inlet and a blood or fluid outlet in fluid communication with the extracorporeal blood circuit or with the fluid circuit and a gas side crossed by a sweep gas and having a gas inlet and a gas outlet;
a control unit configured for commanding execution of a task, said task comprising at least the following steps:
exchanging gas between the blood or fluid flowing through the blood or fluid side of the membrane gas exchanger and the sweep gas flowing through the gas side of the membrane gas exchanger;
obtaining a sweep gas flow rate in the gas side of the membrane gas exchanger;

obtaining a water saturation content at the gas outlet of the membrane gas exchanger;

obtaining a relative humidity at the gas outlet of the membrane gas exchanger;

calculating blood or fluid water losses occurring in the membrane gas exchanger due to gas exchange as a function at least of the sweep gas flow rate, of the water saturation content at the gas outlet and of the relative humidity at the gas outlet;

issuing a signal informing of the water losses and/or compensating at least in part for said water losses.

22. The apparatus according to claim 21, wherein determining the blood or fluid water losses comprises:

obtaining a water saturation content at the gas inlet of the membrane gas exchanger;

obtaining a relative humidity at the gas inlet of the membrane gas exchanger;

calculating the blood or fluid water losses as a function also of the water saturation content at the gas inlet and of the relative humidity at the gas inlet.

23. The apparatus according to claim 22, wherein obtaining the water saturation content at the gas inlet comprises:

obtaining a humidification temperature, wherein the humidification temperature is measured or calculated or is a constant default value;

calculating the water saturation content at the gas inlet as a function of the humidification temperature; and wherein obtaining the relative humidity at the gas inlet comprises:

if the sweep gas is humidified, assuming the relative humidity at the gas inlet equal to 100%; or if the sweep gas is not humidified, assuming the relative humidity at the gas inlet equal to 0%.

24. The apparatus according to claim 21, wherein calculating the blood or fluid water losses is according to any one of the following formulas:

$$Q_{eccor} = Q_{gas} \times C_{saturation\_out} \times (RH_{outlet}/100)$$

or $$Q_{eccor} = Q_{gas} \times ((C_{saturation\_out} \times (RH_{outlet}/100)) - (C_{saturation\_in} \times (RH_{inlet}/100)))$$

wherein:

$Q_{eccor}$ blood water losses in the gas exchanger;

$Q_{gas}$ sweep gas flow rate through the gas exchanger;

$C_{saturation\_out}$ water saturation content at the gas outlet;

$RH_{outlet}$ relative humidity at the gas outlet;

$C_{saturation\_in}$ water saturation content at the gas inlet;

$RH_{inlet}$ relative humidity at the gas inlet.

25. The apparatus according to claim 21, wherein obtaining the sweep gas flow rate comprises:

measuring directly or indirectly the sweep gas flow rate; or collecting a sweep gas flow rate prescribed value.

26. The apparatus according to claim 21, wherein obtaining the water saturation content at the gas outlet comprises:

obtaining a blood or fluid inlet temperature at the blood or fluid inlet of the at least one membrane gas exchanger, wherein the blood or fluid inlet temperature is measured or calculated or is a constant default value;

calculating the water saturation content at the gas outlet as a function of the blood or fluid inlet temperature.

27. The apparatus according to claim 21, wherein obtaining the relative humidity at the gas outlet comprises:

deriving the relative humidity at the gas outlet from the type of the membrane gas exchanger and of the sweep gas flow rate; or assuming the relative humidity at the gas outlet equal to 100%.

28. The apparatus according to claim 21, wherein determining the blood or fluid water losses comprises:

obtaining a blood or fluid inlet temperature at the blood or fluid inlet of the membrane gas exchanger;

obtaining a room temperature;

calculating the blood or fluid water losses as a function at least of the sweep gas flow rate and of the blood or fluid inlet temperature and of the room temperature.

29. The apparatus according to claim 28, wherein determining the blood or fluid water losses comprises:

calculating a water flow rate at the gas outlet as a function of the blood or fluid inlet temperature;

calculating a water flow rate at the gas inlet as a function of the room temperature;

calculating the blood or fluid water losses as difference between the water flow rate at the gas outlet and the water flow rate at the gas inlet.

* * * * *